United States Patent [19]
White

[11] Patent Number: 5,383,537
[45] Date of Patent: Jan. 24, 1995

[54] BRAKE DRUM HAVING AN EXTENSION RING WITH CHILL FINS AND COOLING FINS FORMED THEREON

[75] Inventor: Jay D. White, Galesburg, Mich.

[73] Assignee: Eaton Corporation, Cleveland, Ohio

[21] Appl. No.: 33,689

[22] Filed: Mar. 16, 1993

[51] Int. Cl.⁶ .................... F16D 51/00; F16D 65/78
[52] U.S. Cl. .................... 188/78; 188/264 A; 188/218 R
[58] Field of Search .......... 188/18 A, 71.6, 74, 188/78, 264 A, 264 R, 218 R, 325; 192/113 R

[56] References Cited

U.S. PATENT DOCUMENTS

| | | | |
|---|---|---|---|
| 2,092,421 | 9/1937 | Morgan | 188/218 |
| 2,265,938 | 11/1939 | Eksergian | 188/218 R |
| 2,568,759 | 9/1951 | Page | 188/218 R |
| 2,998,870 | 9/1961 | Herman et al. | 188/264 |
| 3,007,553 | 11/1961 | Sinclair et al. | 188/218 R |
| 3,043,631 | 7/1962 | Swoboda | 301/6 |
| 3,583,533 | 6/1971 | Jones, Jr. | 188/218 R |
| 3,630,323 | 12/1971 | Hickle | 188/218 R |
| 3,889,786 | 6/1975 | Schrader et al. | 188/218 R |
| 3,955,651 | 5/1976 | Hinderks | 188/242 |
| 4,266,638 | 5/1981 | Petersen et al. | 188/218 |
| 4,379,501 | 4/1983 | Hagiwara et al. | 188/218 |
| 4,523,666 | 6/1985 | Murray | 188/218 |
| 4,577,734 | 3/1986 | Williams | 188/218 |
| 4,830,150 | 5/1989 | Denton | 188/264 R |
| 4,889,214 | 12/1989 | Crossan et al. | 188/264 A |

FOREIGN PATENT DOCUMENTS 869081 5/1961 United Kingdom.

Primary Examiner—Robert J. Oberleitner
Assistant Examiner—Chris Schwartz
Attorney, Agent, or Firm—Loren H. Uthoff, Jr.; Howard D. Gordon

[57] ABSTRACT

A cylindrical brake drum including a flanged end and an open end having a radially extending annular extension ring acting as a squealer band and a multiplicity of chill fins irregularly spaced one to another and/or relative to a plurality of equally spaced airflow channels where the chill fins are cast as part of the extension ring and the outside surface of the brake drum where the chill fins are of a substantially constant height relative to the brake drum and act to reduce the size and number of any casting porosities and further move the porosities away from the friction surface of the brake drum thereby improving fatigue strength. A multiplicity of cooling fins are formed on the inboard side of the extension ring. In an alternative embodiment, the extension ring can be formed as a wing which axially extends from the brake drum having a multiplicity of chill fins formed on its outer surface.

8 Claims, 4 Drawing Sheets

BRAKE DRUM HAVING AN EXTENSION RING WITH CHILL FINS AND COOLING FINS FORMED THEREON

RELATED APPLICATIONS

This application relates to application Ser. No. 08/033,688 concurrently filed with this application and entitled, "Brake Drum Having Chill Fins Extending From A Squealer Band" which is assigned to Eaton Corporation and to application 08/033,658 concurrently filed with this application and entitled, "Brake Drum Having Irregularly Spaced Chill Fins Extending From A Squealer Band" which is assigned to Eaton Corporation.

DESCRIPTION OF THE PRIOR ART

Although drum brakes and the brake drums therefore are well known in the prior art and have been in commercial use for a number of years, problems in manufacture and use still exist. Cast iron is a material commonly used for heavy duty brake drums and warranty claims are often made due to in-service cracking of the brake drum. During the casting process, vacuum pockets can result due to the uneven cooling or improper cooling of various cavities within the casting mold. These vacuum pockets (porosities) act as a heat insulator and lead to brake drum malfunction or complete failure due to high localized heating which transforms the metal around the porosity into a different metallurgic state leading to the cracking. This phenomenon most often occurs in the area of the drum where the brake pad contacts the friction surface. It would thus be of great advantage to design a drum which minimizes such porosities and/or confines the porosities to an area of the drum in which minimal damage would occur due to frictional heating.

There also remains a problem with dissipation of heat to ensure that there is effective braking during extensive heavy duty use. Accordingly, many brake drums have heretofore employed fins or other cooling techniques about the exterior surface thereof as a means for directing air along the exterior surface to remove the heat generated in the brake drum and/or create additional airflow between the drum and the wheel to lower the temperature of the tire. On the other hand, providing fins of this type has significantly complicated manufacture since most brake drums are cast and casting a plurality of fins normally requires a more complicated core unless the manufacturer includes some means for forming or attaching the fins such as by cutting or forming grooves or fins or welding the fins to the brake drum which also greatly complicates the manufacturing process.

Additionally, in any such brake drum, there remains concern for its overall strength. Accordingly, it would be advantageous to incorporate any means which would improve the overall strength of the brake drum without unduly adding to its weight. By reducing the size and number of vacuum pockets, the fatigue resistance and consequently the service life of the brake drum is dramatically extended.

Additionally, excitation of the resonant modes of the cylindrical shaped brake drum cause objectionable noise to be produced upon braking which is commonly known in the art as "brake squeal". Methods of reducing brake squeal have included clips between the wheel and drum and the use of various vibration damping materials on the brake drum surfaces.

SUMMARY OF THE INVENTION

A provision of the present invention is to provide a cylindrical braking drum having a multiplicity of chill fins generally axially extending from the outside edge of an extension ring which acts as a squealer band to the outside surface of the braking drum cast as part of the braking drum and formed around the peripheral surface of the braking drum so as to localize any casting porosities into a more central area of the squealer band thereby minimizing damaging effects to the brake drum due to frictional heating. Also, a plurality of cooling fins are formed on the inboard edge of the extension ring to improve air circulation and heat transfer away from the brake drum.

Another provision of the present invention is to provide additional airflow over the brake drum extension ring by forming a multiplicity of cooling fins on the inboard edge of the extension ring thereby changing the nature and extent of the airflow around the extension ring to improve cooling.

Another provision of the present invention is to provide additional airflow over the outer surface of the brake drum using axially extending chill fins to reduce operating temperatures of the brake drum and the wheel and tire by changing the nature and extent of the airflow over the outer surface of the brake drum into a more chaotic airflow having random velocity vectors.

Another provision of the present invention is to provide a multiplicity of axially extending chill fins that are irregularly spaced relative to a plurality of airflow channels formed in the outer surface of the cylindrical braking drum so as to instill a chaotic airflow pattern for improved cooling of the drum and wheel.

Another provision of the present invention is to alter the resonant vibration modes of the brake drum to lower the brake squeal noise level.

Still another provision of the present invention is to strengthen the brake drum by reducing casting porosities and lowering operating temperatures for improved braking performance and service life.

These and other provisions of the present invention are provided in a preferred embodiment thereof including a brake drum assembly including a cylindrical braking drum having a flanged end and an opened end. In the preferred embodiment, the cylindrical braking drum has a multiplicity of irregularly spaced, one from the other, generally axially extending fins around an outer surface thereof generally irregularly spaced relative to a plurality of airflow channels formed in the outer surface of the braking drum. In an alternative embodiment, each of the fins is equally spaced one from the other but irregularly spaced relative to a plurality of airflow channels formed in the outer surface of the braking drum. The chill fins have radially extending sidewalls and are joined both to the inner wall of a brake drum extension ring and the exterior surface of the cylindrical braking drum. The height of the chill fins generally remain at a constant height relative to the extension ring and the outer surface of the brake drum. Alternatively, the chill fins can have a maximum height at the inner wall of the squealer band and then gradually decrease in height moving outwardly away from the extension ring.

This configuration is preferred to reduce weight and reduce the chance of damage as the drum is removed from the casting sand. In addition, the chill fins should be no more than two to three times as high as they are wide to minimize damage to the brake drum casting at the time of gating and sand removal.

The purpose for using the chill fins is to increase the rate of chill of the side of the squealer band or extension ring opposite the metal fill gate during the casting process. In this manner, the chill of the molten metal in the main body of the brake drum at the base of the extension ring is matched with that of the extension ring which allows the porosities in the main body to be largely eliminated by flowing additional metal into the region. Any remaining porosities tend to be restricted to the extension ring where heat damage is much less likely to occur. In this manner, the last metal to chill and solidify is at the casting fill gate. Using the chill fins the porosity of the brake drum casting is dramatically reduced thereby significantly improving the fatigue strength of the casting.

Without the chill fins, a riser would need to be added to the brake drum casting so as to allow for fill of the thick section of the brake drum as it cools. The riser would add additional weight as compared to the chill fins and it would be susceptible to tearing off of the casting prematurely during the shaking out of the casting. This tearing creates a large hole in the casting where the riser attaches which would require that the casting be scrapped.

This and other provisions and advantages of the present invention will become apparent from a reading of the detailed description of the preferred embodiment taken in connection with the attached drawings.

DETAILED DESCRIPTION OF THE PREFERRED EMBODIMENT

Figure 1:
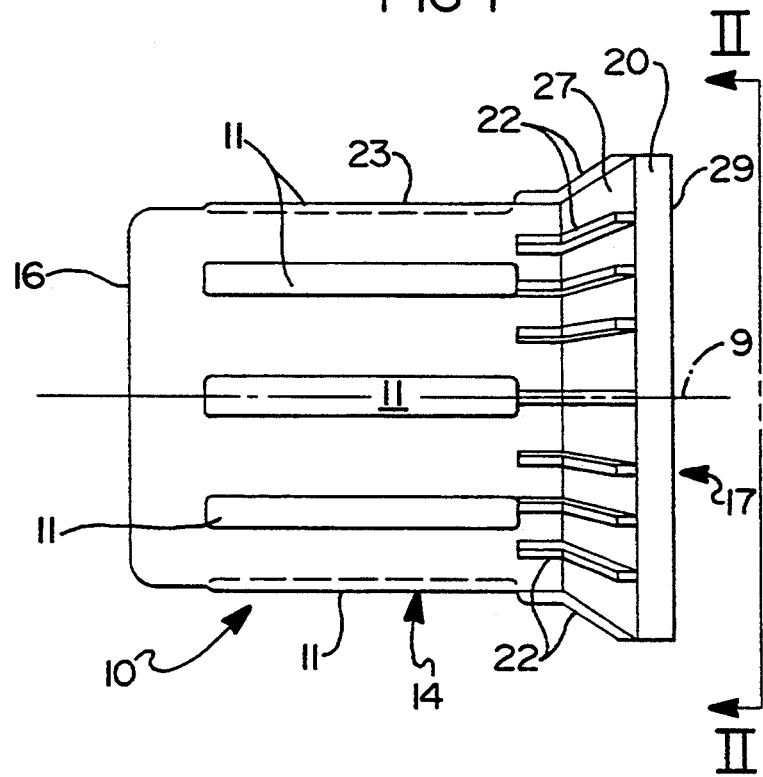
FIG. 1 is an elevational view of the brake drum unit of the present invention.

Certain terminology will be used in the following description for convenience in reference only and will not be limiting. The words "outwardly", "downwardly", "rightwardly", "leftwardly", "clockwise", and "counterclockwise" will designate directions in the drawings in which references are made. The words "inwardly" and "outwardly" will refer to directions toward and away from, respectively, the center of the vehicle (not shown) to which the brake is mounted. Said terminology will include the words above specifically mentioned, derivatives thereof and words of similar import. The term "brake" is used herein is intended to include various friction coupling devices such as clutches, brakes and the like.

FIG. 1 shows an elevational view of the brake drum of the present invention. The brake drum unit 10 of the present invention is shown where a cylindrical brake drum 14 rotatable about an axis of rotation 9 has a flange end 16 and an open end 17 where the brake drum assembly 10 is typically mounted to a vehicle wheel and axle (not shown) and provides a braking force thereto. A plurality of airflow channels 11 are formed in the drum outer surface 23 of the braking drum 14 that foster airflow between the brake drum 14 and the wheel (not shown) to lower operating temperatures. The airflow channels 11 have a major axis parallel to the axis of rotation 9 of the brake drum assembly 10 and are of a pre-determined number (typically ten (10) in number) and location to match with a plurality of hand hold openings (typically five (5) in number) in the vehicle wheel (not shown).

FIG. 1 also shows a plurality of equally spaced airflow channels 11 which are formed in the drum outer surface 23 of the brake drum 14. The number of airflow channels 11 is usually selected such that in mounting a vehicle wheel, the hand hold openings in the wheel (not shown) line up with the airflow channels 11. Typically, for a fifteen (15) inch brake there are ten (10) airflow channels 11 used. The airflow channels 11 are formed in the drum outer surface 23 of the brake drum 14 and function to improve airflow over the surface of the brake drum 14, thereby providing a cooling effect which lowers the temperature of the wheel and subsequently the tire bead of a tire mounted thereon (not shown) for increased service life. By using the present invention to increase airflow over the surface of the brake drum, the tire bead area (not shown) temperature is typically lowered by 20° F. which results in a significant increase in tire life. Outside air is drawn through the wheel hand hold openings (not shown) along the airflow channels 11 and exits between the wheel rim (not shown) and the extension band 20. To improve the airflow, the airflow channels 11 are in approximate alignment with the wheel hand hold openings, the airflow channels 11 extend to a depth of approximately 20% to 40% of the thickness of the brake drum 14 at a point taken immediately adjacent to the airflow channel 11 and have a minimum width of 6 percent of the inside diameter of the brake drum 14. The airflow channels 11 extend from the flange end 16 inward to the inner edge 27 of the extension band 20, thereby providing clearance for a tire valve stem but more importantly for increased airflow over the surface of 25 the brake drum 14. FIG. 1, the airflow channels 11 can extend only to the outboard edge of a multiplicity of chill fins 22.

The airflow channels 11 further increase the airflow between the brake drum 14 and the wheel rim. The wider width as compared to prior art airflow channels of a minimum of six (6) percent of the inside diameter of the brake drum 14 facilitates manufacture and reduces cost. The airflow channels 11 and the brake drum t 4 have an approximate draft angle of 1° for removal from the casting die. The depth of the airflow channels varies from approximately 40% of the average brake drum 14 thickness at the flange end 16 to approximately 20% of the average brake drum 14 thickness at the extension band 20.

Also, along the outside surface 25 of the brake drum 14, there is a minimum separation distance of five (5) percent of the outside circumference of the brake drum 14 between the airflow channels 11. In the preferred embodiment, there are ten (10) channels equally spaced along the periphery of the brake drum 14 and located so that five (5) of the airflow channels 11 are in alignment with the wheel hand hold openings. With this spacing, assembly of the wheel to the mounting bolts (not shown) will always result in an airflow channel 11 being in alignment with each hand hold opening. This airflow channel 11 design provides for improved fatigue resistance, increased stiffness for improved brake torque output, maximized thermal mass for improved energy absorption and is easier and less expensive to fabricate as compared to prior art designs.

FIG. 1 also clearly shows a multiplicity of equally spaced chill fins 22, one to another, pre-determined in number and position to be irregularly spaced relative to the circumferential positions of the airflow channels 11. The effect of this irregular spacing relative to the airflow channels 11, is to create a chaotic airflow over the surface of the brake drum 14 to increase the random nature of the cooling airflow to lower operating temperatures of both the brake drum 14 and the wheel (not shown). Chaotic airflow is airflow that is disturbed in direction of movement by the nonuniform physical characteristics of the surface over which it flows.

Figure 6:
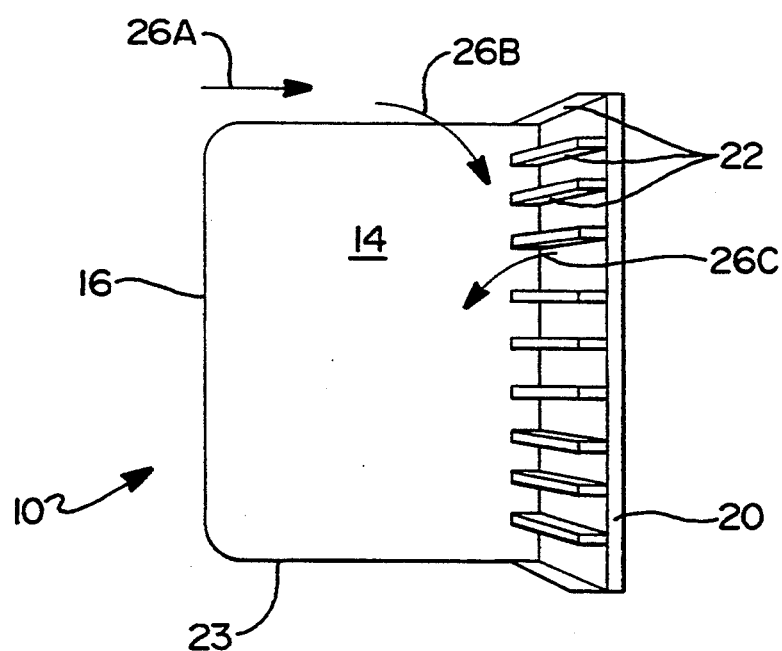
FIG. 6 is an elevational view of the brake drum unit of the present invention without airflow channels.

The preferred embodiment of the brake drum 14 of the present invention is shown where the chill fins 22 are irregularly spaced both one from the other and relative to the airflow channels 11. The operational effect is to create an even more enhanced chaotic airflow condition for increased cooling and also lower the vibrational level of the drum at its resonant frequencies thereby lowering the amplitude of brake squeal noise. While FIG. 6 illustrates the embodiment where the chill fins are irregularly spaced in reference to the airflow channels 11 and one to the other, an alternative embodiment (not shown) would locate the irregularly spaced chill fins such that they would fall in the same relative position on the airflow channels 11. Such an arrangement would be difficult to achieve due to the equal spacing between the airflow channels unless a large number of chill fins 22 were utilized.

In order to provide additional strength and mass to dampen vibration induced into the brake drum assembly 10 during a braking event, an extension band 20 is cast into the drum outer surface 23 of the annular rotatable brake drum 14. The extension band 20 is in the shape of an annular ring which forms part of the cylindrical rotatable brake drum 14 extending radially therefrom and functions to lower the frequency and level of vibrations known in the art as brake squeal while also increasing the overall brake stiffness to reduce deformation of the brake drum 14 during braking.

Figure 2:
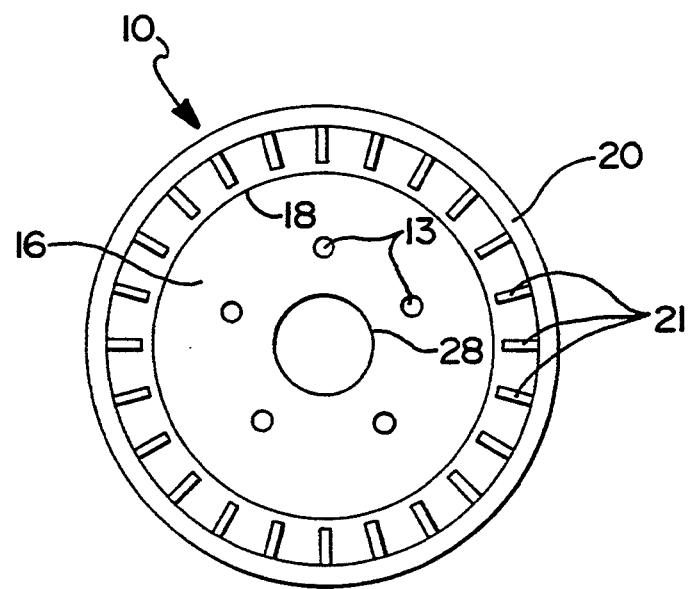
FIG. 2 is a plan view of the brake drum unit shown in FIG. 1.

FIG. 2 is a sectional view of FIG. 1 of the brake drum unit 10 of the present invention. A multiplicity of cooling fins 21 are shown which are formed as part of the extension band 20. The cooling fins 21 function to induce additional chaotic airflow over the brake drum unit 10 especially around the extension band 20 to lower the operating temperature of the brake drum unit 10. The cooling fins can be evenly spaced one from the other, or unevenly spaced which is the preferred configuration to maximize chaotic airflow and to lower vibrational amplitudes thereby increasing the effectiveness of the extension band 20 acting as a squealer band to lower brake squeal.

Also shown in FIG. 2 is the mounting holes 13 where the bolts from the vehicle axle (not shown) pass through the brake drum flange end 16. The hub pilot 28 pilots the brake drum unit 10 onto the vehicle axle for centering and proper alignment.

The chill fins 22 are cast as part of the structure of the brake drum assembly 10 and improve the overall strength of the brake drum assembly 10 by improving the casting process. Also the chill fins 22 provide for increased airflow over and around the outer surface of the brake drum 14 and the extension band 20 thereby providing for improved heat transfer out of the friction surface 18 and the brake drum 14 and improved airflow in the area between the vehicle wheel (not shown) and the brake drum 14 to lower wheel temperatures. The length of the chill fins 22 can be extended outwardly at least to a point past the wheel (not shown) drop center which is the area where the wheel is in closed proximity to the brake drum 14 to get airflow to the tire bead section. This promotes outside airflow across the outer surface of the brake drum 14 so as to lower the operating temperature of the wheel and tire assembly for improved service life. Ideally, the chill fins 22 are substantially parallel to the drum outer surface 23 of the brake drum 14 for at least ½ of the total length of the chill fins 22. The chill fins 22 extend radially from the drum outer surface 23 and in the alternative can be proportionally reduced in height until the top edge of the chill fins 22 converge with the outer peripheral surface of the brake drum 14 thereby forming a wedge-like shape.

During the casting of the brake drum assembly 10, it is desirable to reduce the number and size of any vacuum voids known more commonly as casting porosity to improve the fatigue strength of the brake drum assembly 10. Furthermore, it is possible using the chill fins 22 of the present invention to confine all of such casting porosity deep into the extension band 20 away from the friction surface 18 to prevent hot spots from building in the friction surface 18 and in other sections of the brake drum 14 which can result in transformation of the cast iron metallurgy and result in cracking. Large porosities are formed primarily because the larger cross-sectional area of the extension band 20 chills (cools and solidifies) slower than the thinner section of the brake drum 14.

Figure 3:
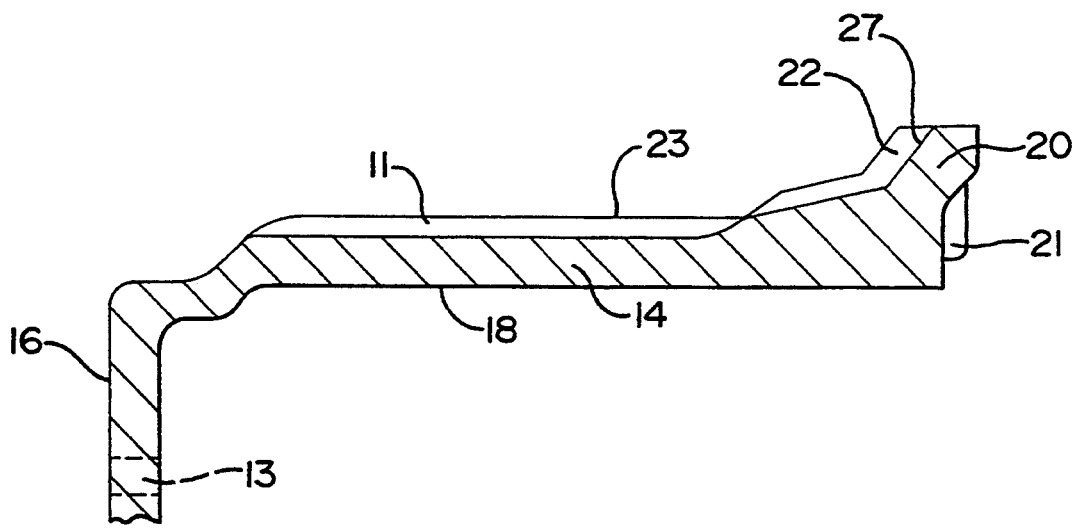
FIG. 3 is a fragmentary cross-sectional elevational view of the brake drum unit of the present invention.

FIG. 3 is a fragmentary cross-sectional view of the brake drum unit 10 of the present invention showing more clearly both the chill fins 22 and the cooling fins 21 formed on the extension band 20.

Figure 4:
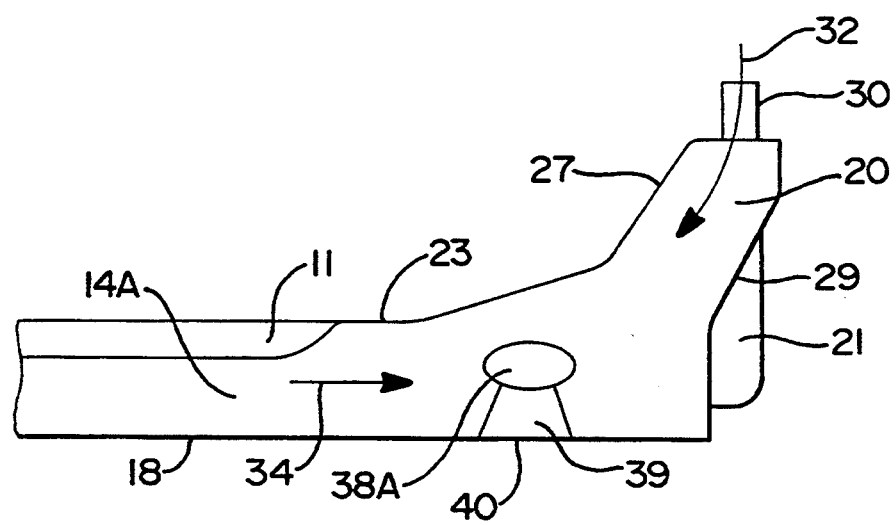
FIG. 4 is a fragmentary cross-sectional elevational view of the drum brake unit of the present invention without chill fins.
Figure 5:
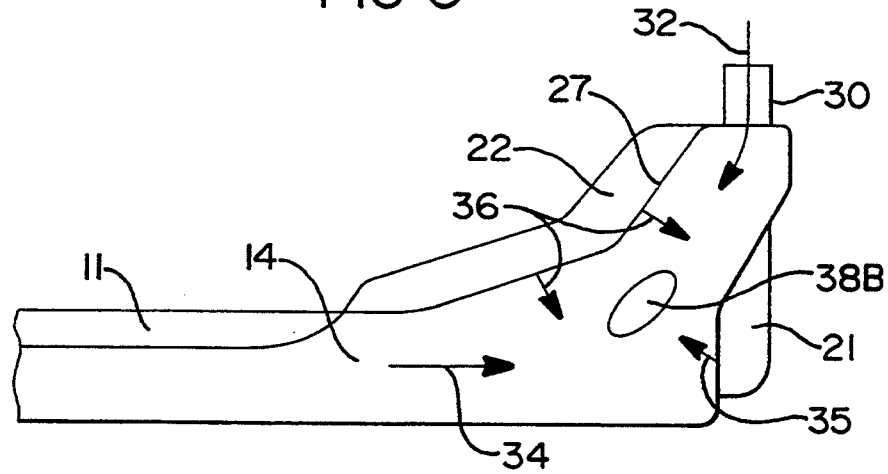
FIG. 5 is a fragmentary cross-sectional elevational view of the brake drum unit of the present invention.

FIGS. 4 and 5 illustrate the effect of the present invention on moving casting porosities and provide a method of assuring that the porosities are reduced in number and size and confined within the casting to an area in the extension band 20 further away from the drum friction surface 18. A plurality of chill fins 22 are cast into the brake drum 14 consisting of a multiplicity of metal fin pieces extending from and joined to the outboard side 25 of the extension band 20 and the drum outer surface 23 of the brake drum 14. As shown in FIG. 4, without the chill fins 22, the porosities tend to form at the interface between the extension band 20 and the thinner area of the brake drum 14 because this is the last area to cool.

FIGS. 4 and 5 show a portion of the inboard portion of the brake drum 14, and specifically where the casting porosity occurs during the manufacturing process. Specifically, FIG. 4 is a cross-section of a prior art brake drum 14A without the chill fins 22 of the present invention. Molten iron 32 enters the casting gate 30 and flows so as to completely fill the mold. Placing the casting gate 30 at the top of the extension band 20 is the most practical location for minimizing the gating scrap and for making a simple and practical pattern design. When the vacuum region 38A prior art brake drum 14A forms so far away from the casting gate 30, the molten iron 32 in the casting gate 30 is choked off from the vacuum region 38A and the molten iron 32 cannot reach and fill the vacuum region 38A. Arrow 34 shows the direction of the cooling and solidifying of the molten iron 32 which results in a region 38A of porosity located at the interface between the thin section of the brake drum 14A and the extension band 20. Region 38A is the last area to cool and solidify such that the shrinking metal creates a vacuum void at region 38A which acts as a heat insulator which causes a localized superheated region 39 in the casting during braking which leads to cracking of the drum.

At the friction surface 18 and more specifically at the interface surface 40 of the drum, the effects of the superheated region 39 and the rapid cooling of the air creates a martensitic phase iron at the interface surface 40. The formation of martensitic phase iron leads to material fatigue by thermally induced cracking commonly referred to as heat checking. The insulating effect of the vacuum region 38A allows the heat checks to grow large enough to lead to severe cracking and eventually to fatigue failure of the brake drum 14A.

FIG. 5 is a cross-sectional elevational view of a brake drum 14B with the chill fins 22 of the present invention. In a similar manner to the process described infra, molten iron 32 is introduced into the mold. Using the chill fins 22, the molten iron 32 now also begins to rapidly cool in the direction of arrow 36 which interacts and more closely matches the cooling rate of the brake drum 14B as shown by arrow 34 to force any porosity further up into region 38B which is more central in the extension band 20. In this manner, the porosity is further from the friction surface 18 where the heat is generated and the localized heating of the brake drum 14B is reduced resulting in a higher fatigue strength and improved brake performance. Also, the molten iron 32 can generally reach and fill any vacuum voids formed in the central region of the extension band 20.

Now referring to FIG. 6, one embodiment of the chill fins 22 of the present invention is shown in an elevational view of the brake drum assembly 10 of the present invention. There are typically approximately thirty (30) chill fins 22 used on a brake drum 14 having a fifteen (15) inch inside diameter. The chill fins 22 are irregularly spaced, one from the other, primarily to induce a chaotic airflow over the drum outer surface 23 for improved air cooling of the brake unit 10 and the wheel and tire assembly (not shown). A chaotic airflow is one that is more random in nature with an increased randomness in the localized airflow velocity vectors. This particular embodiment does not have but could include the airflow channels 11 as shown in other embodiments.

The chill fins 22 extend outwardly from the extension band 20 axially along the drum outer surface 23 of the brake drum 14 to a point on the brake drum 14 of approximately one-fourth of the width of the brake drum 14 as measured from the drum edge 29. The chill fins 22 extend outwardly from and are joined to the inner edge 27 of the extension band 20 and are of a substantially constant height relative to the drum outside surface 23. The chill fins 22 are relatively narrow in width where their width is approximately 5 to 20 percent of their length. The chill fins 22 are furthermore, equally spaced one from the other with a typical separation distance of approximately 1.5 inches on a brake drum 14 having an inner diameter of 15 inches. Thus, the chill fins 22 have a separation distance of approximately 10 percent of the inner diameter of the brake drum 14.

Figure 7:
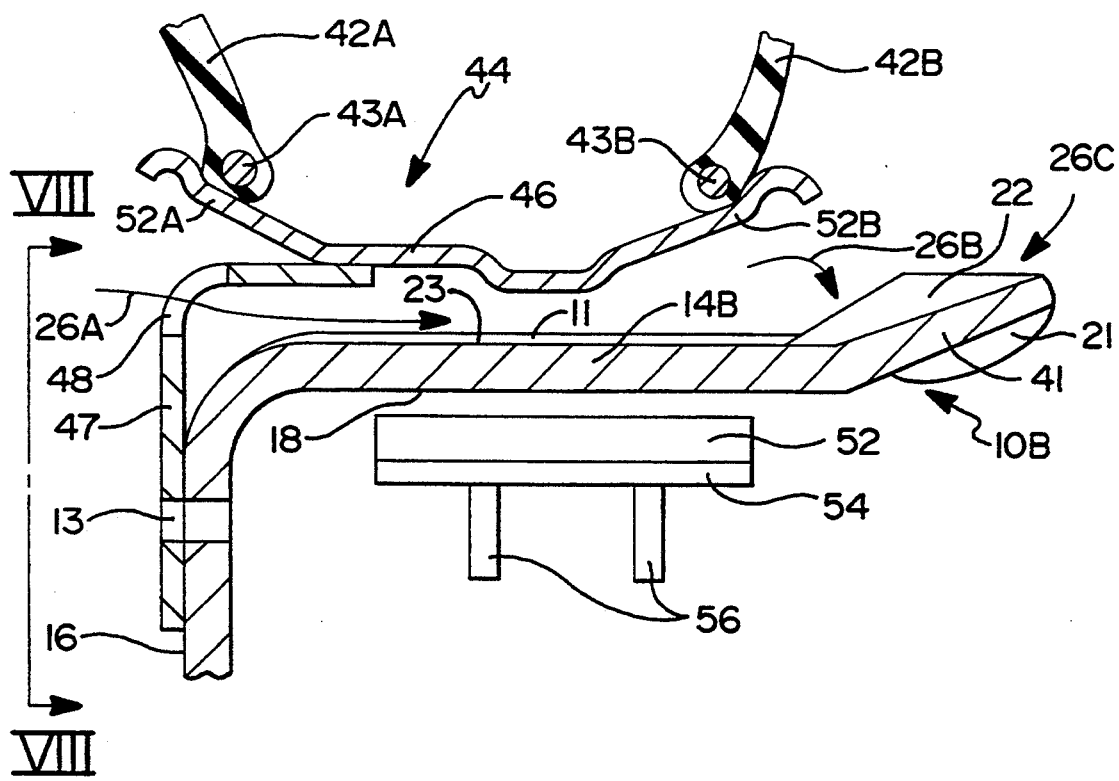
FIG. 7 is a fragmentary cross-sectional elevational view of an alternate embodiment of the brake drum unit of the present invention showing a wheel, tire and a brake shoe.

Now referring to FIG. 7, an alternate embodiment of the brake drum 14 of the present invention is shown as brake drum unit 10B. An extension wing 41 has been formed on the inboard edge of the brake drum 14B and acts to dissipate heat generated at the friction surface 18 when the brake shoe 52 comes in contact thereby providing a braking effect to the vehicle. The brake shoe 52 is attached to a brake table 54 which is in turn supported and moved through action on the brake web 56.

The brake drum 14B supports and is attached to a wheel 47 by bolts from the axle (not shown) passing through the bolt holes 13 located in the flange end 16 and the wheel 47. The wheel 47 has a plurality of hand hold openings 48 (typically five (5) in number) which are used to handle the wheel assembly 44 during the mounting process. The wheel 47 is attached to a wheel rim 46 which supports a tire having a left and right sidewall 42A and 42B respectively. Contained within the sidewalls 42A and 42B are tire beads 43A and 43B respectively which are supported on the rim 46 by left and right bead seats 52A and 52B respectively.

The extension wing 41 functions as a squealer band to reduce vibration of the brake drum 14B and as a heat dissipation device to lower operating temperatures. A multiplicity of cooling fins 21 are formed on the inner surface of the extension wing 41 similar to the cooling fins 21 attached to the extension band 20 as shown in FIG. 3.

Also shown is one of the plurality of airflow channels 11, some of which are in alignment with the wheel hand holds 48 to allow increased airflow, as indicated by airflow arrow 26A over the drum outer surface 23 and through the airflow channels 11 of the brake drum 14B. This increased airflow cools both the wheel rim 46 and the tire beads 43A and 43B thereby increasing the life of the tire. The chill fins 22 can be equitant from the drum outer surface 23 over their length or can vary in height according to the needs of the casting process.

The multiplicity of chill fins 22 can be circumferentially equally spaced or can be unequally spaced one from the other. The preferred embodiment incorporates unequal spacing similar to that shown in FIG. 6 to increase chaotic airflow and cooling. Airflow arrows 26B and 26C indicate the relative general motion of the induced airflow over the brake drum 14B as it rotates.

Figure 8:
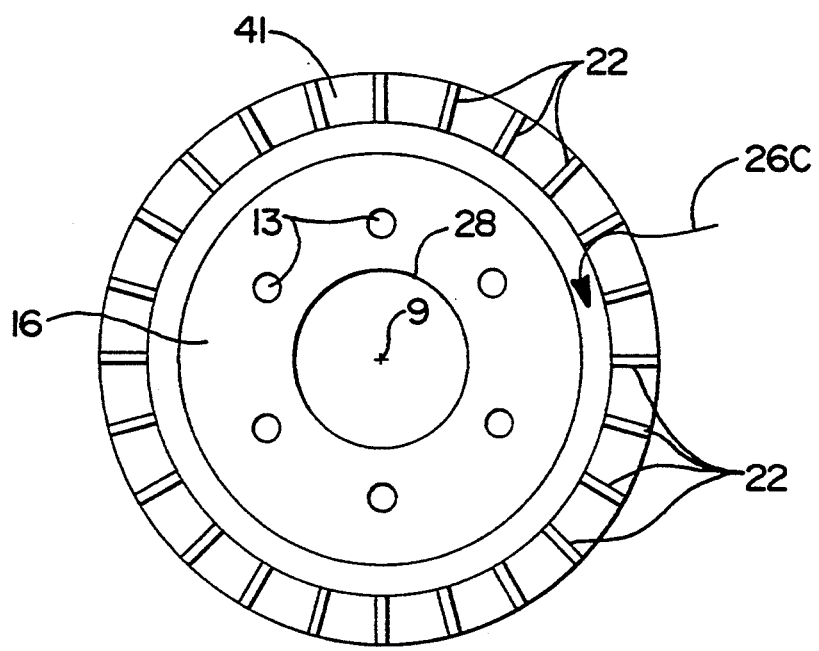
FIG. 8 is a plan view of the brake drum unit shown in FIG. 7.

FIG. 8 is a plan view of the brake drum 14B shown in FIG. 7. The extension wing 41 is shown with a multiplicity (typically around thirty (30)) of chill fins 22 unequally spaced and radially oriented.

It may be seen from the above, that a relatively compact and easily manufacturable improvement to a braking drum assembly is provided which will provide localized porosity in the casting to a location such as the extension ring that minimizes harmful affects such as cracking along with an overall strengthening of the braking drum assembly and improvement of the airflow over the exterior surface of the brake drum resulting in a lower operating temperature of the wheel and tire and drum assembly.

Although this invention has been described in its preferred embodiment with a certain degree of particularity, it is understood such description is by way of example only, that certain modifications are possible in the spirit and the scope of the invention as hereinafter claimed.

I claim:

1. A brake drum comprising:

a cylindrical braking drum having a flanged end opposite an open end and having a drum outer surface therebetween, said braking drum having an axis of rotation and an inner diameter;

an extension band formed on said drum outer surface of said braking drum in substantial close proximity to said open end, said extension band having an inboard side facing opposite said flanged end and an outboard side facing opposite said open end;

a multiplicity of generally axially extending chill fins formed on said drum outer surface and attached to said outboard side of said extension band, said chill fins being irregularly circumferentially spaced one from the other for creating chaotic airflow over said drum outer surface; and a multiplicity cooling fins formed on said inboard side of said extension band, said cooling fins extending axially inboard.

2. A brake drum comprising:

a cylindrical braking drum having a flanged end opposite an open end and having a drum outer surface therebetween, said braking drum having an axis of rotation and an inner diameter;

an extension band formed on said drum outer surface of said braking drum in substantial close proximity to said open end, said extension band having an inboard side facing opposite said flanged end and an outboard side facing opposite said open end;

a multiplicity of generally axially extending chill fins formed on said drum outer surface and attached to said outboard side of said extension band;

a multiplicity of cooling fins formed on said inboard side of extension band, said cooling fins extending axially inboard; and a plurality of airflow channels formed in said outer surface, said airflow channels generally axially extending from said chill fins to said flanged end.

3. The brake drum as set forth in claim 2, wherein said airflow channels have a radial depth of approximately 40 percent of a nominal thickness of said braking drum and a minimum circumferential width of 6 percent of said inner diameter of said cylindrical braking drum.

4. The brake drum as set forth in claim 2, wherein said chill fins are irregularly spaced relative to said airflow channels.

5. A brake drum comprising:

a cylindrical braking drum having a flanged end opposite an open end and having an outer surface therebetween, said braking drum having an axis of rotation and an inner diameter passing through said axis of rotation;

an extension wing having a wing outer surface and a wing inner surface extending from said open end axially inboard, said extension wing shaped as an annular ring and formed as part of said braking drum; and a multiplicity of generally axially extending chill fins formed on said drum outer surface and attached to said wing outer surface, said chill fins being irregularly circumferentially spaced one from the other.

6. A brake drum comprising:

a cylindrical braking drum having a flanged end opposite an open end and having an outer surface therebetween, said braking drum having an axis of rotation and an inner diameter passing through said axis of rotation;

an extension wing having a wing outer surface and a wing inner surface extending from said open end axially inboard, said extension wing shaped as an annular ring and formed as part of said braking drum;

a multiplicity of generally axially extending chill fins formed on said drum outer surface and attached to said wing outer surface; and a plurality of airflow channels formed in said outer surface, said airflow channels generally axially extending from said chill fins to said flanged end, said airflow channels being substantially rectangular in shape.

7. The brake drum as set forth in claim 6, wherein said airflow channels have a radial depth of approximately 40 percent of a nominal thickness of said braking drum and a minimum circumferential width of 6 percent of said inner diameter of said cylindrical braking drum.

8. A brake drum comprising:

a cylindrical braking drum having a flanged end opposite an open end and having a drum outer surface therebetween, said braking drum having an axis of rotation and an inner diameter;

an extension band formed on said drum outer surface of said braking drum in substantial close proximity to said open end, said extension band having an inboard side facing opposite said flanged end and an outboard side facing opposite said open end;

a multiplicity of generally axially extending chill fins formed on said drum outer surface and attached to said outboard side of said extension band;

a plurality of airflow channels substantially rectangular in shape formed in said outer surface, said airflow channels generally axially extending from said chill fins to said flanged end, said chill fins being irregularly spaced relative to said airflow channels.

* * * * *